United States Patent [19]

Hsiung

[11] Patent Number: 4,992,814
[45] Date of Patent: Feb. 12, 1991

[54] CONVERTIBLE FILM CARTRIDGE AND TOY DEVICE

[76] Inventor: Charles J. Hsiung, Monterey Park, Calif.

[21] Appl. No.: 502,769

[22] Filed: Apr. 2, 1990

[51] Int. Cl.$^5$ ............... G03B 17/26; A63H 17/00
[52] U.S. Cl. ............................. 354/275; 354/354; 446/77; 446/78
[58] Field of Search ............ 354/275, 276, 277, 278, 354/279, 281, 284, 354; 446/76, 77, 78

[56] References Cited

U.S. PATENT DOCUMENTS 3,798,439  3/1974  Land et al. ...................... 354/354
4,247,183  1/1981  Thompson ......................... 354/275

OTHER PUBLICATIONS

Elinor H. Stecker, "Film Cans are Fantastic", Jul. 1990, *Popular Photography*, pp. 52-55.

*Primary Examiner*—A. A. Mathews
*Assistant Examiner*—Cassandra C. Spyron

[57] ABSTRACT

An improved film cartridge construction comprised of several basic components (12, 14, 16 and 18) which are releasably connected to form a film cartridge 10, 88 or 90) and which can be recombined to form a wide variety of toys (114 and 126) and other articles 96 and 104).

19 Claims, 3 Drawing Sheets

CONVERTIBLE FILM CARTRIDGE AND TOY DEVICE

TECHNICAL FIELD

This invention relates to photographic film and is particularly directed to an improved cartridge for facilitating the loading and handling of photographic film and which is composed of a plurality of parts which are convertible to form a variety of toys and the like.

BACKGROUND ART

It has long been known, in the photographic field, that packaging film cartridges has numerous advantages over conventional reels or cassette-packaged film, both in loading and processing. Thus, with cartridge film, the cartridge is loaded by simply dropping the cartridge into the camera, whereas with cassette or reel type film, it is necessary to securely attach the leading edge of the film to the windup spool and to thread the film into the camera. Furthermore, film cartridges can be removed and replaced at any time, even when partially exposed, whereas reel and cassette film cannot. Therefore, cartridge film has been widely accepted. On the other hand, conventional film cartridges are loaded with film at the film manufacturer and, in order to process the film, the cartridge must be broken to remove the film, leaving the fragments of the cartridge to be discarded. However, with current interest in environmental protection and concern over disposition of the vast amounts of waste which mankind is continuously creating, it is highly desirable to minimize or eliminate the waste produced by the film cartridge fragments. One step toward reduction of such waste is found in my prior patent, U.S. Pat. No. 4,887,111, issued Dec. 12, 1989, which discloses a film cartridge which is formed of a plurality of interchangeable parts which can be recombined for reuse as other film cartridges. This is a considerable step toward reducing waste from film cartridge fragments. Nevertheless, it is believed that further progress toward waste reduction is needed. Thus, none of the prior art film cartridges have been entirely satisfactory.

DISCLOSURE OF THE INVENTION

These disadvantages of prior art film cartridges are overcome with the present invention and an improved film cartridge is provided which is composed of a plurality of parts which are interchangeable to permit reuse to form other film cartridges and which are also capable of being recombined to form a variety of toys. In this way, the components of the film cartridges are capable of multiple reuse, in a variety of applications, which greatly extend the useful life of the film cartridge components and which reduce the need for creating additional materials to perform the functions which the recombined film cartridge components are capable of performing.

The advantages of the present invention are preferably attained by providing an improved film cartridge comprised of three basic components which are releasably connected to form a film cartridge and which can be recombined to form a wide variety of toys and other articles.

Accordingly, it is an object of the present invention to provide an improved film cartridge construction.

Another object of the present invention is to provide an improved film cartridge construction which greatly reduces the waste created by fragments of broken film cartridges.

A further object of the present invention is to provide an improved film cartridge construction which is capable of a wide variety of additional uses.

A specific object of the present invention is to provide an improved film cartridge construction comprised of several basic components which are releasably connected to form a film cartridge and which can be recombined to form a wide variety of toys and other articles.

These and other objects and features of the present invention will be apparent from the following detailed description, taken with reference to the figures of the accompanying drawing.

BEST MODE FOR CARRYING OUT THE INVENTION

Figure 1:
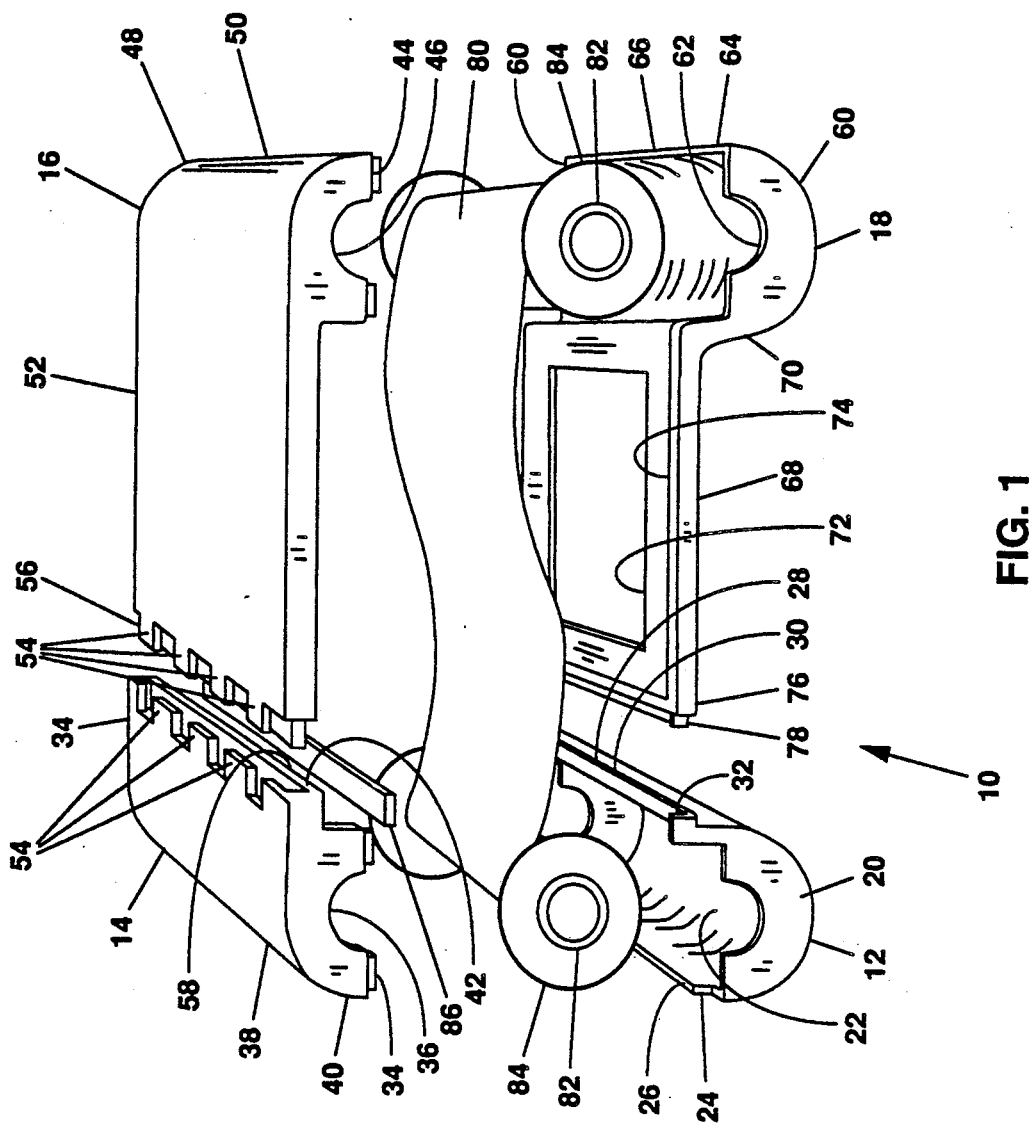
FIG. 1 is an exploded view of a film cartridge construction embodying the present invention.

In that form of the present invention chosen for purposes of illustration in FIG. 1, a film cartridge, indicated generally at 10, is shown comprising four components 12, 14, 16 and 18. Component 12 is a half cylinder having a pair of arcuate closed ends 20 which are formed with central recesses 22. Along one edge 24 of the half cylinder 12 is a flange 26, while a flat plate 28 extends along the opposite edge 30 of the half cylinder 12 and has pillars 32 projecting upwardly at each end of the plate 28. Component 14 also has a pair of arcuate closed ends 34 formed with central recesses 36 and has a curved wall 38 covering approximately 90° of arc from one edge 40 of the ends 34 and having a flanged portion 42 projecting tangentially outward from the wall 38. Component 16 is generally similar to component 14 having a pair of arcuate closed ends 44 formed with central recesses 46 and having a curved wall 48 covering approximately 90° of arc from one edge 50 of the ends 44 and having a flanged portion 52 projecting tangentially outward from the wall 48. It will be seen that the flanged portion 52 of component 16 is considerably longer than the flanged portion 42 of component 14. Also, it will be seen that the facing edges of the flanged portions 42 and 52 are provided with suitable means, such as spaced tabs 54, for frictional engagement with each other. Thus, the tabs of flanged portion 42 of component 14 frictionally engage the edge 56 of flanged portion 52 of component 16, while the tabs 54 of flanged portion 52 of component 16 frictionally engage the edge 58 of flanged portion 42 of component 14. In this manner, components 14 and 16 may be releasably attached to assemble the film cartridge 10. In the same manner, the flange 26 of component 12 frictionally engages edge 40 of component 14 and posts 30 of plate 28 of component 12 frictionally engage the arcuate closed ends 34 of component 14 to releasably assemble component 12 to component 14. Finally, component 18 is a half cylinder, similar to component 12, formed with a pair of arcuate closed ends 60 formed with central recesses 62 and having a flange 64 projecting from one edge 66 of component 18 for frictional engagement with edge 50 of component 16. Component 18 also has a flanged portion 68 projecting laterally from the opposite edge 70 of component 18 and formed with a central window 72. Flanges 74 project upwardly from the aides of the flanged portion 68 for frictional engagement with the sides of flanged portion 52 of component 16 and the ends 76 of the flanges 74 are formed, as seen at 78, to frictionally engage the pillars 32 of component 12.

In use, components 12, 14, 16 and 18 may be snapped together, by frictionally engaging the various elements, as described above, to form a film cartridge 10, of the type described in my aforementioned patent, U.S. Pat. No. 4,811,111; with components 16 and 18 forming a supply container, while components 12 and 14 form a take-up container and flanged portions 52 and 68 form a bridge for guiding film between the supply container and take-up container. When a film 80 is loaded into the cartridge 10 the hubs 82 of the spools 84 will rest in the recesses 22, 36, 46 and 62 and flanged portions 52 and 68 will guide movement of the film 80 between the supply container, composed of components 16 and 18, and the take-up container, composed of components 12 and 14. If desired, a strip 86, formed of suitable material such as velvet, foam rubber or the like, may be mounted on the plate 28 of component 12 to prevent undesired light from entering the take-up container to damage the exposed film.

Figure 2:
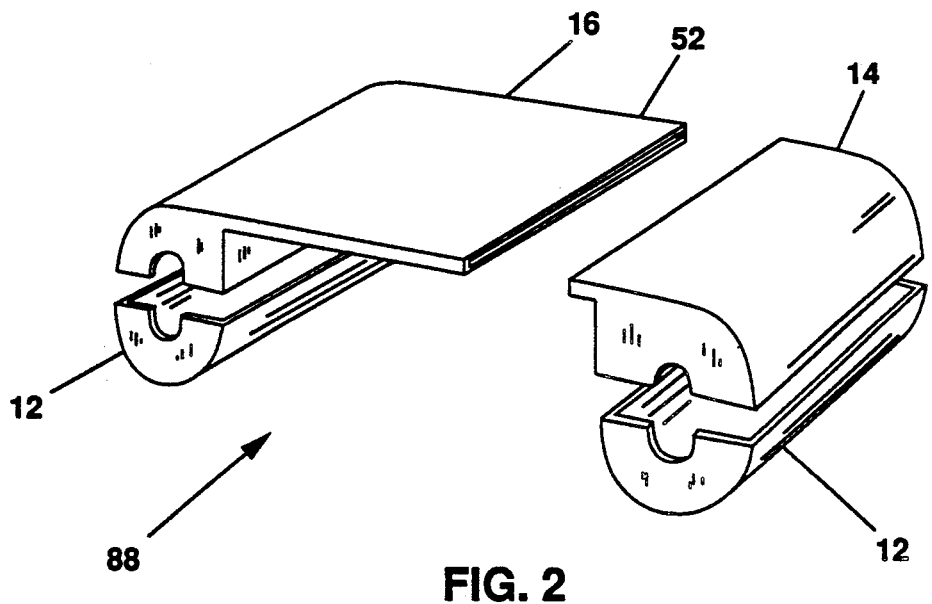
FIG. 2 is an exploded view of an alternative form of the film cartridge construction of FIG. 1.

FIG. 2 shows a film cartridge, indicated generally at 88, assembled from two components, similar to component 12 of FIG. 1, plus one component 14 and one component 16. The film cartridge 88 will function in the same manner as the film cartridge 10 of FIG. 1, except that, because component 18 of the film cartridge 10 of FIG. 1 has been replaced by a second component 12, only the flanged portion 52 of component 16 will form a bridge between the supply container, formed by components 12 and 14 and the take-up container formed by components 12 and 16.

Figure 3:
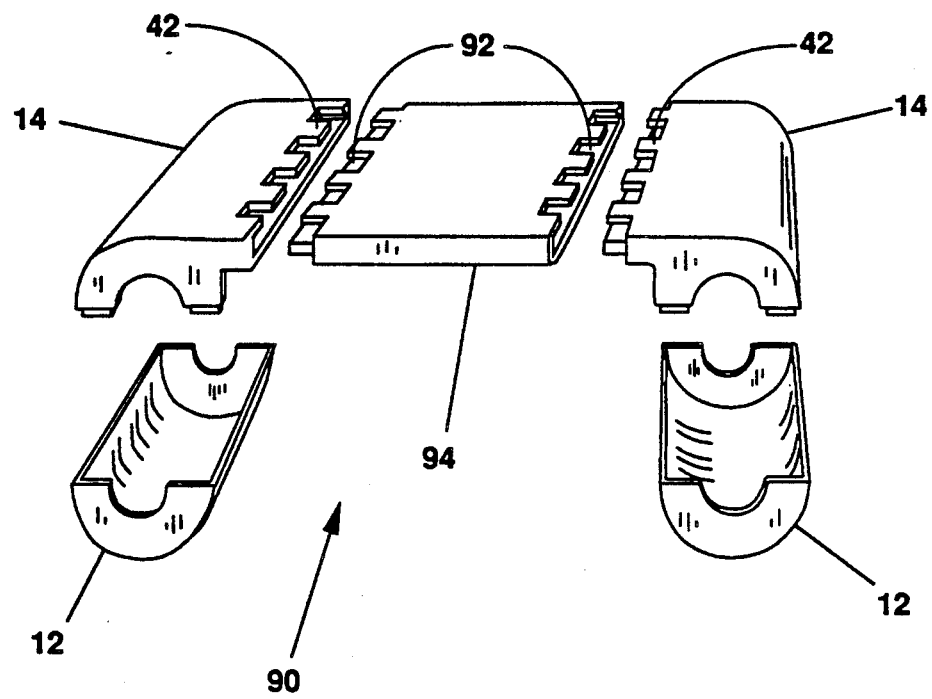
FIG. 3 is an exploded view of a further alternative form of the film cartridge construction of FIG. 1.

FIG. 3 shows a further alternative form of film cartridge, indicated generally at 90, composed of two components similar to component 12 of FIG. 1 and two components similar to component 14 of FIG. 1. In the film cartridge 90, the flanged portions 42 of the two components 14 are frictionally connected to respective edges 92 of a bridge member 94. In this way the supply container is composed of one component 12 and one component 14 and the take-up container is also composed of one component 12 and one component 14, while the bridge member 94 is releasably assembled with these components to form the bridge between the supply container and the take-up container.

Figure 4:
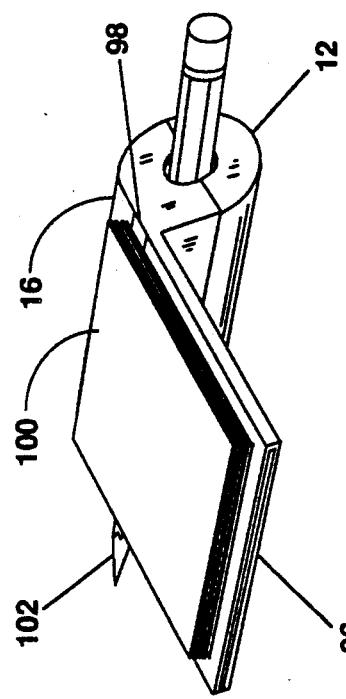
FIG. 4 ia an isometric view showing a notepad holder formed appropriately assembling selected components of the film cartridge of FIG. 1.

As seen in FIGS. 1, 2 and 3, the components 12, 14, 16 and 18 may be releasably assembled in a variety of ways to form film cartridges 10, 88 and 90. In addition, the components 12, 14, 16 and 18 may be selectively assembled to form a wide variety of additional objects having utility apart from the photographic field. Thus, FIG. 4 shows a notepad holder 96 created by assembling one component 16 with one component 12. By applying a strip 98 of double-stick adhesive to the outside of the flanged portion 52 of the component 16, a pad 100 of note paper may be attached to the notepad holder 96 and a pencil 102 may be inserted through the openings formed by the recesses 46 of the component 16 and the recesses 22 of the component 12. It is found that the "Post-It" pads, available from the Minnesota Mining and Manufacturing Co., Milwaukee, Minn., are ideally suited for this purpose.

Figure 5:
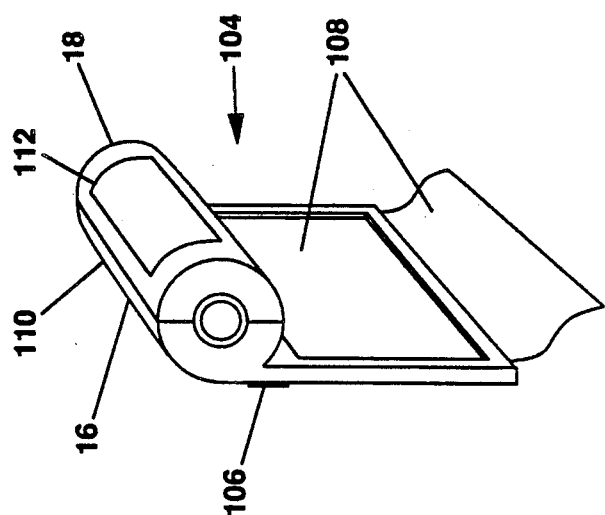
FIG. 5 is an,,isometric view showing an alternate form of the notepad holder of FIG. 4.

FIG. 5 shows an alternative form of notepaper holder, indicated generally at 104, may be formed by assembling one component 16 with one component 18 and applying a strip 106 of double-stick adhesive to the outside of the flanged portion 52 of the component 16 to facilitate mounting the notepaper holder 104 on a wall or other desired surface. A roll of paper 108 may be housed within the cylinder 110 formed by components 16 and 18 and the flanged portions 52 and 68 will serve to guide the paper strip 108 as it is unreeled. If desired, an advertising sticker 112 or the like may be applied to the cylinder 108.

Figure 6:
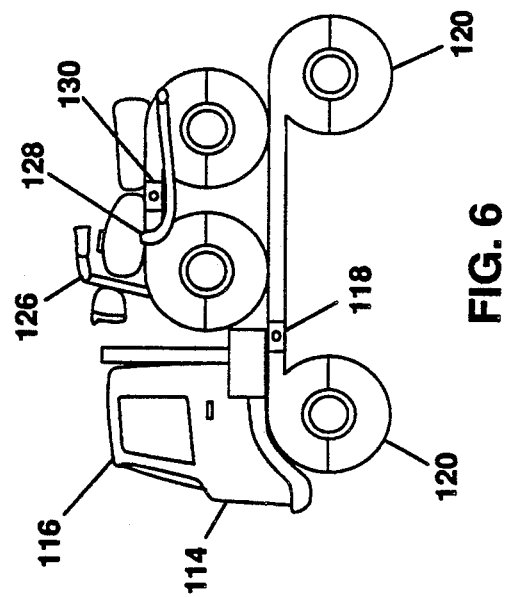
FIG. 6 is a side view showing a toy truck carrying a toy motorcycle, each formed by assembling selected components of the film cartridge of FIG. 1 with suitable accessory components.
Figure 7:
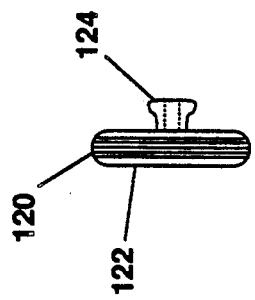
FIG. 7 is an end view of the wheel components of the toys of FIG. 6.

FIG. 6 shows a toy truck 114 created by assembling an auxiliary truck cab component 116 to the film cartridge 10 of FIG. 1 by means of snap tabs 118 which frictionally engage the edges of the flanged portion 52 of component 16 to mount the truck cab component 116 to overlie component 14 of the film cartridge 10 of FIG. 1. If desired, wheel components 120 may be provided, as seen in FIG. 7, having roller portions 122 of greater diameter than the cylinder formed by the assembly of components 12 and 14 or components 16 and 18 and has a hub portion 124 formed to frictionally fit within the opening formed by recesses 22 and 36 of components 12 and 14 and by recesses 46 and 62 of components 16 and 18 to assemble the wheel components 120 to the film cartridge 10 to form the toy truck 114. A toy motorcycle 126 is shown being carried by the toy truck 114 and is created by assembling two components 14 and two components 12, together with an auxiliary component 128 simulating the motor, seat and handlebars and having snap tabs 130 which frictionally engage the edges of the flanged portions 42 of the components 14. Again, if desired, wheel components 120 may be attached to the components 12 and 14 to facilitate rolling the toy motorcycle 126 across a floor or other surface.

It will be apparent that a wide variety of articles can be formed by appropriate assembly of the various components of the film cartridges 10, 88 and 90 together with appropriate auxiliary components, as desired. Moreover, numerous variations and modifications can obviously be made without departing from the spirit of the present invention. Therefore, it should be clearly understood that the forms of the present invention described above and shown in the figures of the accompanying drawings are illustrative only and are not intended to limit the scope of the present invention.

What is claimed is:

1. An article of manufacture comprising:
   a plurality of basic components capable of frictional attachment in a first configuration to form a film cartridge and assemblable in at least one other configuration to form another desired device,
   at least one of said basic components being a half cylinder having a pair of closed ends each formed with a central recess and having a flange extending along at least one edge of said half cylinder for frictional engagement with an adjacent component.

2. The article of claim 1 wherein:
said one of at least basic components has a flat plate extending along the at least one edge of said half cylinder opposite the edge from which said flange extends and having posts projecting upward from each end of said plate for frictional engagement with an adjacent component.

3. The article of claim 1 wherein:
at least one of said basic components comprises a pair of arcuate closed ends each having a central recess, together with a curved wall extending approximately 90° from one edge of said arcuate ends and having a flanged portion projecting tangentially from said wall with means provided along the outer edge of said flanged portion for frictional engagement with an adjacent component.

4. The article of claim 3 wherein:
said film cartridge includes a supply cylinder and a take-up cylinder, and
the flanged portion of said at least one of said basic components projects outwardly a sufficient distance to form a bridge between the supply cylinder and the take-up cylinder of said film cartridge.

5. The article of claim 1 wherein:
said one of said at least basic components has a flanged portion extending laterally from the edge of said half cylinder opposite said flange, said flanged portion having a window formed therein and having flanges extending upwardly along the opposite edge of said flanged portion for friction engagement with an adjacent component.

6. The article of claim 1 wherein:
one of said basic components comprises a generally rectangular plate having means provided along opposite edges thereof for frictional engagement with adjacent components.

7. The article of claim 1 wherein:
four of said basic components are assembled to form said article.

8. The article of claim 7 wherein:
two of said four basic components each comprises a half cylinder having a pair of closed ends each formed with a central recess and having a flange extending along at least one edge of said half cylinder for frictional engagement with an adjacent component.

9. The article of claim 7 wherein:
two of said basic components each comprises a half cylinder having a pair of closed ends each formed with a central recess and having a flange extending along at least one edge of said half cylinder for frictional engagement with an adjacent component,
a flat plate extending along at least one edge of said half cylinder opposite the edge from which said flange extends and having posts projecting upward from each end of said plate for frictional engagement with an adjacent component.

10. The article of claim 8 wherein:
a third of said four basic components comprises a pair of arcuate closed ends each having a central recess, together with a curved wall extending approximately 90° from one edge of said arcuate ends and having flanged portion projecting tangentially from said wall with means provided along the outer edge of said flanged portion for frictional engagement with an adjacent component.

11. The article of claim 9 wherein:
a third of said four basic components comprises a pair of arcuate closed ends each having a central recess, together with a curved wall extending approximately 90° from one edge of said arcuate ends and having a flanged portion projecting tangentially from said wall with means provided along the outer edge of said flanged portion for frictional engagement with an adjacent component.

12. The article of claim 7 wherein said film cartridge includes a supply cylinder and a take-up cylinder and wherein:
one of said four basic components comprises a half cylinder having a pair of closed ends each formed with a central recess and having a flange extending along at least one edge of said half cylinder for frictional engagement with an adjacent component; a second of said four basic components comprises a pair of arcuate closed ends each having a central recess, together with a curved wall extending approximately 90° from one edge of said arcuate ends and having a flanged portion projecting tangentially from said wall with means provided along the outer edge of said flanged portion for frictional engagement with an adjacent component; a third of said four basic components comprises a pair of arcuate closed ends each having a central recess, together with a curved wall extending approximately 90° from one edge of said arcuate ends and having a flanged portion projecting tangentially from said wall and extending upwardly a sufficient distance to form a bridge between the supply cylinder and the take-up cylinder of said film cartridge with means provided along the outer edge of said flanged portion for frictional engagement with an adjacent component; and the fourth of said basic components comprises a half cylinder having a pair of closed ends each formed with a central recess and having a flange extending along at least one edge of said half cylinder for frictional engagement with an adjacent component and having a flanged portion extending laterally from the edge of said half cylinder opposite said flange, said flanged portion having a window formed therein and having flanges extending upwardly along the opposite edges of said flanged portion for frictional engagement with an adjacent component.

13. The article of claim 7 wherein: said film cartridge includes a supply cylinder and a take-up cylinder and wherein:
one of said four basic components comprises a half cylinder having a pair of closed ends each formed with a central recess and having a flange extending along at least one edge of said half cylinder for frictional engagement with an adjacent component; and having a flat plate extending along the at least one edge of said half cylinder opposite the edge from which said flange extends and having posts projecting upward from each end of said plate for frictional engagement with an adjacent component; a second of said four basic components comprises a pair of arcuate closed ends each having a central recess, together with a curved wall extending approximately 90° from one edge of said arcuate ends and having a flanged portion projecting tangentially from said wall with means provided along the outer edge of said flanged portion for frictional engagement with an adjacent component; a third of said four basic components comprises a pair of arcuate closed ends each having a central recess, together with a curved wall extending approximately 90° from one edge of said arcuate ends and having a flanged portion projecting tangentially from said wall and extending upwardly a sufficient distance to form a bridge between the supply cylinder and the take-up cylinder of said film cartridge with means provided along the outer edge of said flanged portion for frictional engagement with an adjacent component; and the fourth of said basic components comprises a half cylinder having a pair of closed ends each formed with a central recess and having a flange extending along at least one edge of said half cylinder for frictional engagement with an adjacent component and having a flanged portion extending laterally from the edge of said half cylinder opposite said flange, said flanged portion having a window formed therein and having flanges extending upwardly along the opposite edges of said flanged portion for frictional engagement with an adjacent component.

14. The article of claim 7 wherein:
said film cartridge includes a supply cylinder and a take-up cylinder and wherein:
two of said basic components each comprise a half cylinder having a pair of closed ends each formed with a central recess and having a flange extending along at least one edge of said half cylinder for frictional engagement with an adjacent component; a third of said four basic components comprises a pair of arcuate closed ends each having a central recess, together with a curved wall extending approximately 90° from one edge of said arcuate ends and having a flanged portion projecting tangentially from said wall with means provided along the outer edge of said flanged portion for frictional engagement with an adjacent component; and the fourth of said four basic components comprises a pair of arcuate closed ends each having a central recess, together with a curved wall extending approximately 90° from one edge of said arcuate ends and having a flanged portion projecting tangentially from said wall and extending upwardly a sufficient distance to form a bridge between the supply cylinder and the take-up cylinder of said film cartridge with means provided along the outer edge of said flanged portion for frictional engagement with an adjacent component.

15. The article of claim 7 wherein:
said film cartridge includes a supply cylinder and a take-up cylinder and wherein:
two of said basic components each comprise a half cylinder having a pair of closed ends each formed with a central recess and having a flange extending along at least one edge of said half cylinder for frictional engagement with an adjacent component; and having a flat plate extending along the at least one edge of said half cylinder opposite the edge from which said flange extends and having posts projecting upward from each end of said plate for frictional engagement with an adjacent component; a third of said four basic components comprises a pair of arcuate closed ends each having a central recess, together with a curved wall extending approximately 90° from one edge of said arcuate ends and having a flanged portion projecting tangentially from said wall with means provided along the outer edge of said flanged portion for frictional engagement with an adjacent component; and the fourth of said basic components comprises a pair of arcuate closed ends each having a central recess, together with a curved wall extending approximately 90° from one edge of said arcuate ends and having a flanged portion projecting tangentially from said wall and extending upwardly a sufficient distance to form a bridge between the supply cylinder and the take-up cylinder of said film cartridge with means provided along the outer edge of said flanged portion for frictional engagement with an adjacent component.

16. The article of claim 2 further comprising:
at least one auxiliary component frictionally attached to said at least one of said basic components to form said article.

17. The article of claim 16 wherein:
said auxiliary component is a truck cab component having snap tabs projecting from the lower edge thereof for frictional engagement with at least one of said basic components.

18. The article of claim 16 wherein:
said auxiliary component is a wheel member having a roller portion of greater diameter than a cylinder formed by two of the basic components each comprising a half cylinder having a pair of closed ends each formed with a central recess and having a flange extending along at least one edge of said half cylinder for frictional engagement with an adjacent component and having a hub projection engageable with the opening formed by the recesses in the arcuate end walls of the connected basic components to frictionally attach said wheel member to said article.

19. The article of claim 1 wherein:
two of said basic components each comprise a half cylinder having a pair of closed ends each formed with a central recess and having a flange extending along at least one edge of said half cylinder for frictional engagement with an adjacent component; two other basic components each comprise a pair of arcuate closed ends each having a central recess, together with a curved wall extending approximately 90° from one edge of said arcuate ends and having a flanged portion projecting tangentially from said wall with means provided along the outer edge of said flanged portion for frictional engagement with an adjacent component; and another basic component comprises a generally rectangular plate having means provided along opposite edges thereof for frictional engagement with adjacent components.

* * * * *